W. NALEPKA.
PIT CAR BRAKE.
APPLICATION FILED SEPT. 6, 1911.
1,018,261.  Patented Feb. 20, 1912.
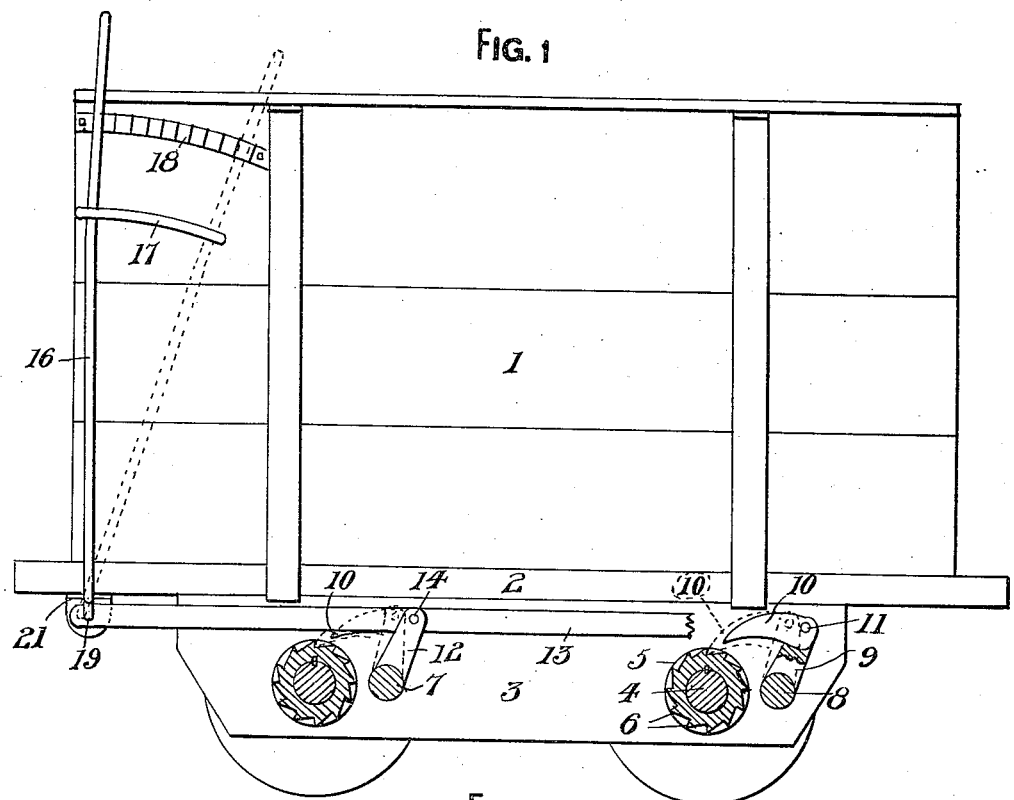
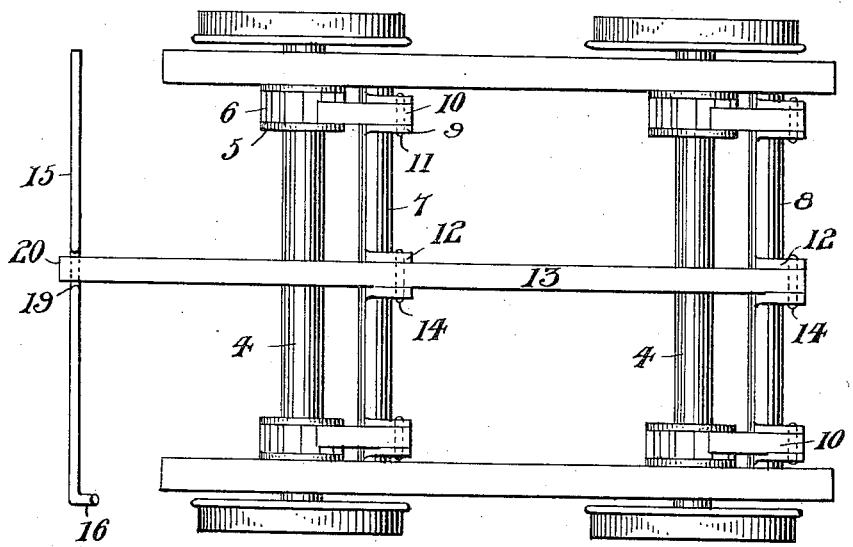
WITNESSES:
INVENTOR.
W. Nalepka
BY
ATTORNEYS.

UNITED STATES PATENT OFFICE.

WALENTY NALEPKA, OF SOUTH OMAHA, NEBRASKA, ASSIGNOR OF ONE-HALF TO LOUIS KULAWIK, OF SOUTH OMAHA, NEBRASKA.

PIT-CAR BRAKE.

1,018,261.  Specification of Letters Patent. Patented Feb. 20, 1912.

Application filed September 6, 1911. Serial No. 647,865.

*To all whom it may concern:*

Be it known that I, WALENTY NALEPKA, a subject of the Emperor of Austria-Hungary, residing at South Omaha, in the county of Douglas and State of Nebraska, have invented certain new and useful Improvements in Pit-Car Brakes, of which the following is a specification, reference being had therein to the accompanying drawing.

This invention relates to brakes, particularly adapted for pit cars, and has for its object to provide a brake in a manner as hereinafter set forth, with means, when operated, engaging with the axles of the car to prevent backward movement thereof without interfering with the forward movement of the car, and further to maintain the car at a stand-still when occasion so requires, especially when the car is upon an incline.

Further objects of the invention are to provide a car brake which is simple in its construction and arrangement, strong, durable, efficient in its use, readily set up in operative position with respect to the car, and comparatively inexpensive to manufacture.

With the foregoing and other objects in view, the invention consists of the novel construction, combination and arrangement of parts as hereinafter more specifically described and illustrated in the accompanying drawings, wherein is shown the preferred embodiment of the invention, but it is to be understood that changes, variations, and modifications can be resorted to which come within the scope of the claim hereunto appended.

In the drawings—Figure 1 is an elevation with parts in section, of a brake in accordance with this invention, and further showing the adaptation of the brake in connection with a pit car; Fig. 2 is a top plan of the brake set up in connection with a pair of axles, the body of the car being removed.

Referring to the drawings by reference characters, 1 denotes the side of a car body and 2 the bottom. Depending from the bottom 2 is a pair of longitudinally disposed hangers 3, in which are journaled a pair of transversely extending axles 4, these latter projecting outwardly from each of the hangers 3. Fixedly secured to each of the axles 4, in proximity to each of the hangers 3, is a collar 5, having its periphery cut away to provide a circumferentially extending series of ratchet teeth 6, the said toothed collars 5 forming elements of the brake.

Journaled in and extending within the hangers 3 are a pair of rock shafts 7, 8, the former arranged rearwardly of the forward axle 4, while the latter is arranged rearwardly of the rear axle 4. Each of said rock shafts in proximity to each end is formed with a pair of laterally extending apertured lugs 9, between which is pivotally connected the rear end of a dog 10. The pivots for the dogs 10 are indicated at 11, and said dogs 10 are adapted to engage the ratchet teeth 6 to prevent back rotation of the axles 4, but not interfering with the forward movement of said axles 4.

Each of the shafts 7 and 8, intermediate its end, is formed with a pair of apertured crank arms, 12, and extending between said pair of crank arms 12 is a longitudinally extending actuating bar 13 which is pivoted to each pair of crank arms 12 by pins 14. The bar 13 is disposed approximately central with respect to the bottom of the car and projects forwardly of the hangers 3. Extending transversely with respect to the bottom 2, and connected to the forward end of the bar 13 is the lower member 15 of an L-shaped operating lever. The vertical member of said lever is indicated at 16, and projects at one side of the car body and extends through a stop 17. The member 16 is adapted to engage the teeth of a rack 18 where the movement of the member 16 is arrested. The rack 18 also constitutes means for maintaining the member 16 in adjusted position. The lower member 15 of the operating lever has the intermediate portion thereof cranked, as at 17, and to the said cranked portion 19 is connected the forward end 20 of the bar 13. The horizontal member of the operating lever is coupled to the bottom of the car by brackets or loops 21.

The normal position of the dogs 10 is as shown in full lines on Fig. 1 clear of the ratchet teeth 6, but when the operating lever is shifted rearwardly, that is to the position shown in dotted lines on Fig. 1, the dogs are carried to such position by the movement of rock shafts 7 and 8, due to the shifting forwardly of the actuating bar 13. When the dogs 10 are shifted forwardly, they are moved in engagement with the ratchet teeth 6, to prevent the back rotation of the axle 4, but will not interfere with the forward movement of the axles.

What I claim is:

A brake for cars comprising a pair of axles, a pair of collars fixed to each of said axles in proximity to each end thereof and each provided with ratchet teeth, hangers carried by the body of the car and through which said axles extend, a rock shaft arranged rearwardly of each of said axles and journaled in said hangers, a pair of rearwardly extending lugs carried by each of said shafts in proximity to each end thereof, a pair of crank arms carried by each of said shafts intermediate its ends, a forwardly projecting dog pivotally connected to each pair of lugs and capable of engaging with the ratchet teeth of a collar when the shaft is rocked in one direction thereby preventing back rotation of the axles, a longitudinally extending operating bar pivotally connected to said pairs of crank arms and projecting forwardly of the forward axle, and an operating lever having a right-angularly disposed lower end provided with a cranked portion connected to said bar and adapted when operated to shift the latter, thereby moving the dogs into and out of engagement with said ratchet teeth.

In testimony whereof I affix my signature in the presence of two witnesses.

WALENTY NALEPKA.

Witnesses:
J. LEVY,
I. PERELMAN.